Dec. 12, 1933.                K. BERGER                1,939,249
                                VALVE
                          Filed Oct. 3, 1929
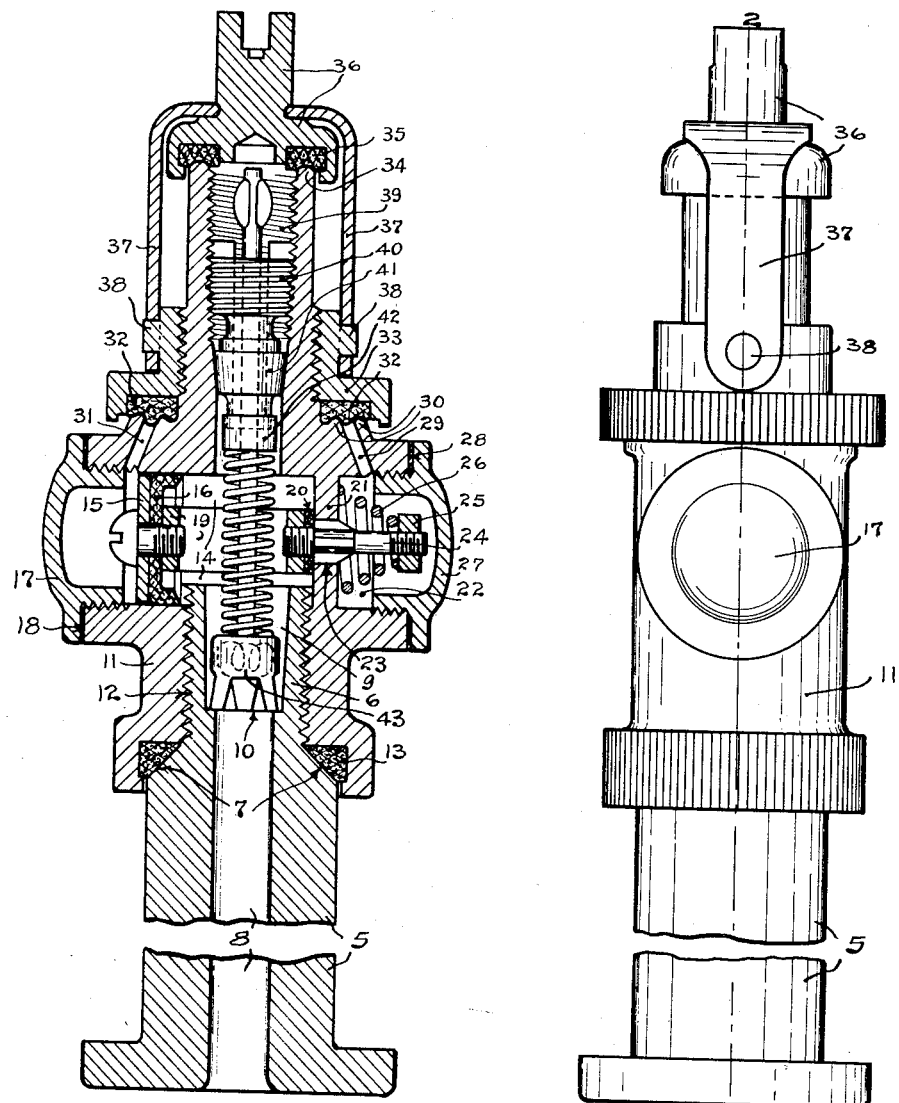
Fig. 2          Fig. 1
Fig. 3
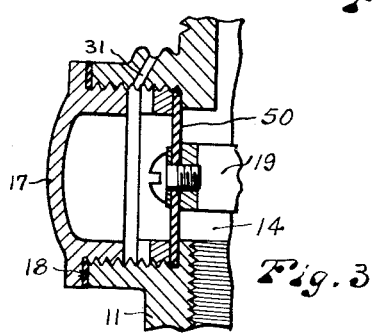
INVENTOR
Knute Berger
BY
Fred C. Matheny
ATTORNEY Patented Dec. 12, 1933

1,939,249

UNITED STATES PATENT OFFICE 1,939,249

VALVE

Knute Berger, Seattle, Wash.

Application October 3, 1929. Serial No. 397,018

3 Claims. (Cl. 152—11.5)

My invention relates to improvements in valves and the general object of my invention is to provide a valve of simple and efficient construction through which fluid under pressure may be introduced into a fluid container, said valve being provided with safety relief means which will prevent the pressure within the fluid container from exceeding a predetermined minimum for which the valve is set.

A more specific object is to provide a valve of this nature for use on the valve stem of a pneumatic tire to facilitate the inflation of the tire to the correct pressure and to prevent over inflation of said tire.

Another object is to provide a valve of this nature which may be adjusted to release at different pressures corresponding to the desired maximum pressure of the tire to which it is applied.

A further object is to provide a pneumatic tire valve of this class which may be applied as a cap to the valve stem of a tire and which will afford an airtight closure for said valve stem and a seal against the escape of air at all times except while the tire is being inflated.

While this valve is shown and described as applied to a pneumatic tire it will be understood that it is capable of various other uses.

Pneumatic tires of various sizes are designed to operate most efficiently and most satisfactorily at predetermined pressures and are liable to be damaged if they are used in an over inflated or an under inflated condition. In inflating tires it is common practice to apply an air hose and a pressure gauge alternately to the tire valve until the gauge registers substantially the correst amount. Often the tire is over inflated in this way and it is necessary to open the valve manually and allow some of the air to escape. This method of inflation often necessitates several applications of the air hose and the gauge and consumes considerable time and also often results in a rough approximation, with the actual pressure in the tire varying several pounds per square inch from the correct pressure. It further necessitates the use of a separate gauge which is not always available and which is easily misplaced or lost thus often making it necessary to inflate the tires by guess.

In accordance with my invention I provide a valve of cheap, simple and efficient construction which may be applied as a cap to a pneumatic tire valve stem and which will serve as a gauge to insure the inflation of the tire to the correct pressure, said valve being arranged to open to the atmosphere and permit the escape of air when the desired maximum pressure for which the valve is set has been reached, the opening of the valve serving the double purpose of preventing more air from entering the tire and warning the person who is inflating the tire that the desired pressure has been obtained.

Other and more specific objects of the invention will be apparent from the following description taken in connection with the accompanying drawing.

In the drawing Figure 1 is an elevation, on an enlarged scale, of a valve constructed in accordance with my invention, showing the same applied to a valve stem.

Fig. 2 is a view in vertical section of the same substantially on broken line 2—2 of Fig. 1.

Fig. 3 is a fragmentary sectional view of a modified form of the invention in which a flexible diaphragm is used instead of a movable piston.

Like reference numerals designate like parts throughout the several views.

In the drawing 5 designates a tire valve stem having an externally threaded upper end 6 of reduced diameter affording an inclined external shoulder 7 and having an axial bore 8 enlarged at its upper end as at 9 to afford a shoulder 10. This valve stem may be the usual tire valve stem.

My valve comprises a main tubular valve housing 11 internally threaded at its inner end as at 12 to screw onto the end 6 of the valve stem and having a packing or gasket 13 arranged to be pressed against the shoulders 7 to form an air seal. A transverse piston chamber or bore 14 is formed in the housing 11 just outwardly from internally threaded lower end portion 12 and a piston member embodying a disc 15 and a cup washer 16 is disposed within said piston chamber 14.

In Fig. 3, I have shown the piston replaced by a flexible diaphragm 50 which functions in the same way as the piston. A cap 17 is screw threaded into the outer end of the passageway 14 and a gasket 18 is provided underneath the flanged edge of said cap to form an air seal. The inner side of the piston member 15—16 is secured to one end of a yoke 19 which extends lengthwise within the piston chamber 14 and has a valve member 20 on its other end arranged to seat against a wall 21 which separates the piston chamber 4 from a spring chamber 22 at the other side of the housing. The valve member 20, when seated, closes an opening 23 in the wall 21. A stem 24 is secured to the same end of the yoke 19 that carries the valve member 20 and extends through the opening 23 into the spring chamber 22. A nut 25 is provided on the outer end of the stem 24 and a compression spring 26 is interposed between the nut 25 and the wall 21 for drawing the valve member against the wall to seal the opening 23 against the escape of air. A cap 27 is screw threaded into the outer end of the spring chamber 22 and has a gasket 28 under the flanged edge thereof to form an air seal. An air escape passageway 29 extends from the spring chamber 22 outwardly through the wall of the housing 11 and terminates in an annular valve seat 30 on the exterior of the housing. A similar passageway 31 extends from that portion of the bore 14 outside of the piston 15—16 to the valve seat 30 to relieve pressure against the outer side of the piston. The valve seat 30 may be formed of two or more concentric annular ribs or ridges rounded on their top sides and the escape passageway 29 may terminate in the trough between said ridges as shown in Fig. 2.

The valve seat 30 is engaged by a resilient valve member 32 in the end of a cap 33 which is threaded onto the smaller outer end of the valve housing. When this cap is screwed down tightly it positively closes and seals the passageways 29 and 31 so that no air can escape therefrom. The outer end of the valve housing 11 is rounded as at 34 to form a valve seat for a resilient valve member 35 in a cap 36. A bracket 37 of inverted U shape fits over the cap 36 and is pivotally secured to studs 38 which extend outwardly from diametrically opposite points on the cap 33. When the cap 33 is screwed down to apply the valve member 32 to the valve seat 30 the cap 36 is also drawn down and the valve member 35 is caused to seal the outer end of the valve housing against the escape of air. When the cap 33 is loosened or screwed outwardly the cap 36 and bracket 37 may be tilted over to one side, thus allowing an air hose to be applied to the top end of the valve housing.

The interior of the valve housing 11 is axially bored and threaded from the outer end inwardly to afford a passageway 39 for the reception of valve mechanism of well known standard construction which is designated generally by the numeral 40. The air seal members 41—42 of this valve mechanism are located above the piston chamber 14 and the lower end of said valve mechanism extends down through said piston chamber 14 and through the yoke 19 and into the valve stem 6 and terminates in a spider 43 which rests on the shoulder 10 in said valve stem. The form of construction and method of operation of this valve mechanism is well known and will not be described in detail.

This valve is adapted to be installed on the valve stem of a pneumatic tire and allowed to remain there. At all times, except when the tire is being inflated, the device will function as an airtight cap for the valve stem and the several parts will occupy the positions shown in Fig. 2, the valve member 32 sealing the openings 29 and 31 and preventing the escape of any air which might pass the piston 15—16 or the valve 20 and the axial passageway 39 in the valve housing being doubly sealed by the usual valve members 41—42 and by the valve member 35. When air is to be introduced into the tire the cap 33 is unscrewed far enough to uncover the ends of the passageways 29 and 31 and to allow the cap 36 to be turned over to one side out of the way. The air hose is then applied in the usual way to the outer end 34 of the valve housing. The air under pressure must pass through the piston chamber 14 before it can enter the tire and consequently the pressure in the piston chamber 14 is always the same as the pressure in the tire. This air pressure is exerted against the piston member 16 and when it becomes great enough to overbalance the force of the spring 26 it will move the piston to the left and unseat the valve member 20, thus allowing the air to escape through the passageway 23, spring chamber 22 and relief port 29 to the atmosphere. As soon as the pressure drops below the maximum for which the spring 26 is set said spring will close the valve 20 and the escape of air will be shut off. By removing the cap 27 and adjusting the nut 25 the effective pressure of the spring 26 may be varied and the valve adjusted to operate at different pressures. This makes it possible to use the same valve for tires of different size requiring inflation to different pressures. With this type of valve the inflating of a tire to the correct pressure is accomplished without use of a gauge and by one application of the air hose to the valve, the valve serving as an automatic gauge and relief means for preventing over inflation of the tire and warning the operator by the hiss of the escaping air when the required pressure within the tire has been attained. After the air hose is removed from the valve the cap 36 is replaced and the cap 33 is screwed down tightly thus sealing the ports 29 and 31 and preventing the escape of air regardless of the condition of the valve members 41—42. The pressure in the piston chamber 14 is always equal to the pressure within the tire but a slight leakage of air past the piston or past the valve 20 will not cause an appreciable reduction of pressure in the tire because the caps 17 and 27 are both airtight and the passageways 29 and 31 are both sealed by the valve member 32.

This automatic valve is simple and compact in construction, neat in appearance, reliable and efficient in operation, not expensive to manufacture, easy to install on tire valve stems of the usual type and not large heavy or cumbersome. It saves time and encourages proper inflation of the tires thus saving tire expense and trouble.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In a valve, an intake tube for a pneumatic tire, said intake tube embodying a valve housing having an axial passageway and provided with a pressure chamber, an inlet valve in said axial passageway, pressure responsive means in said pressure chamber, a wall at one end of said pressure chamber, said wall having a valve opening therein, means forming a spring chamber beyond said wall communicating with said valve opening, an exhaust valve in said pressure chamber for closing said valve opening, a yoke connecting said pressure responsive means and said exhaust valve, the axial bore of said tube intersecting said pressure chamber between said pressure responsive means and said wall, a stem on said exhaust valve extending into said spring chamber, a spring on said stem for closing said exhaust valve, said spring chamber having an air exhaust outlet communicating therewith.

2. In a valve, an intake tube for a pneumatic tire, a valve housing connected with said tube and having an axial passageway and provided with a transverse piston chamber, a valve in said axial passageway, a wall at one end of said piston chamber, said wall having a valve opening therethrough, means forming a spring chamber beyond said wall which communicates with said valve opening, a piston in said piston chamber, a valve member in said piston chamber for closing said valve opening in said wall, a yoke connecting said piston and said valve member, a stem on said yoke extending into said spring chamber, a spring on said stem for holding said valve member closed, said valve member being arranged to be opened by pressure exerted against said piston, a nut on the stem for holding the spring, a removable cap for said spring chamber affording access to said nut for adjusting the spring.

3. In a valve, an intake tube for a pneumatic tire, said intake tube embodying a valve housing having an axial passageway and provided with a transverse pressure chamber, an inlet valve in said axial passageway, a wall at one end of said transverse pressure chamber, said wall having a valve opening therein, an exhaust valve in said transverse pressure chamber for closing said valve opening, a pressure responsive member in said transverse pressure chamber, the area of said pressure responsive member which is exposed to the pressure within said transverse pressure chamber being greater than the corresponding area of said exhaust valve, spring means urging said exhaust valve closed, and a yoke connecting said exhaust valve and said pressure responsive member whereby said pressure responsive member will be yieldingly supported by said spring means and whereby movement of said pressure responsive member may open said exhaust valve.

KNUTE BERGER.